(12) United States Patent
Gaya Pol et al.

(10) Patent No.: US 12,157,323 B2
(45) Date of Patent: Dec. 3, 2024

(54) LUBRICATION FOR CARRIAGE BEAM ARRANGEMENTS

(71) Applicant: Hewlett-Packard Development Company, L.P., Spring, TX (US)

(72) Inventors: Bartomeu Gaya Pol, Sant Cugat del Valles (ES); Niels Sanchez Van Den Beuken, Sant Cugat del Valles (ES); Oscar Orozco, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 161 days.

(21) Appl. No.: 18/005,407

(22) PCT Filed: Jul. 15, 2020

(86) PCT No.: PCT/US2020/042117
§ 371 (c)(1),
(2) Date: Jan. 13, 2023

(87) PCT Pub. No.: WO2022/015301
PCT Pub. Date: Jan. 20, 2022

(65) Prior Publication Data
US 2023/0264498 A1    Aug. 24, 2023

(51) Int. Cl.
*B41J 25/00*    (2006.01)

(52) U.S. Cl.
CPC .................................. *B41J 25/001* (2013.01)

(58) Field of Classification Search
CPC ........ B41J 25/001; B41J 19/142; B41J 19/18; B41J 29/02; B41J 19/00; F16N 7/24
See application file for complete search history.

(56) References Cited

U.S. PATENT DOCUMENTS

| | | |
|---|---|---|
| 6,843,549 B2 | 1/2005 | Cajigas et al. |
| 9,056,506 B2 | 6/2015 | Shiota |
| 2009/0101443 A1 | 4/2009 | Kawai |

FOREIGN PATENT DOCUMENTS

| | | |
|---|---|---|
| JP | 04-158072 A | 6/1992 |
| JP | 04-238970 A | 8/1992 |
| JP | 2559126 Y2 | 1/1998 |
| JP | 11-314420 A | 11/1999 |
| KR | 20-1998-0020207 U | 7/1998 |

*Primary Examiner* — Lisa Solomon
(74) *Attorney, Agent, or Firm* — Jordan IP Law, LLC

(57) ABSTRACT

It is hereby disclosed a carriage arrangement for lubricating a carriage, wherein the arrangement comprises: a carriage; a carriage beam; a drive mechanism to move the carriage along a longitudinal direction of the carriage beam; and a lubrication roller at a fixed position relative to the carriage beam, the lubrication roller having an outer surface with a non-lubricating section and a lubricating section each at a determined angular position; wherein the carriage is to contact the outer surface as it moves passed the lubrication roller and wherein the contact causes a rotation of the roller that modifies the angular positions of the lubricating section and the non-lubricating section.

15 Claims, 5 Drawing Sheets

LUBRICATION FOR CARRIAGE BEAM ARRANGEMENTS

BACKGROUND

In a printing operation of a printing device, a carriage, which is designed to carry an active component of a printing system such as, e.g., a printhead or a scanner, is moved relative to a print media item to perform an action associated to such media such as scanning it or depositing printing fluid to generate an image. The carriage is designed to move along a carriage guide and is to be propelled along the carriage guide by a drive mechanism.

A carriage such as that described above can be employed in printing devices for printing inks and in 3D printing devices wherein layers of build material are selectively solidified by layers with the aid of printing fluids that are printed to the layers of build material.

Similarly, in a scanning operation of a scanning device, which may be included in multifunction printers (MFPs) and other devices, a document to be scanned is placed on a transparent window for scanning. The document may be placed, face down (i.e., where "face" refers to the side of the document to be scanned) on one side of the window. A carriage, which has coupled thereto a scan bar including optics for scanning the document, may then be moved along the length of the opposite side of the window along a carriage beam. The carriage, and thus the scan bar, may be propelled along the carriage rod by a drive mechanism that, in an example, includes a motor and a flexible belt.

BRIEF DESCRIPTION OF THE DRAWINGS

Various example features will be apparent from the detailed description which follows, taken in conjunction with the accompanying drawings, wherein.

DETAILED DESCRIPTION

Figure 1:
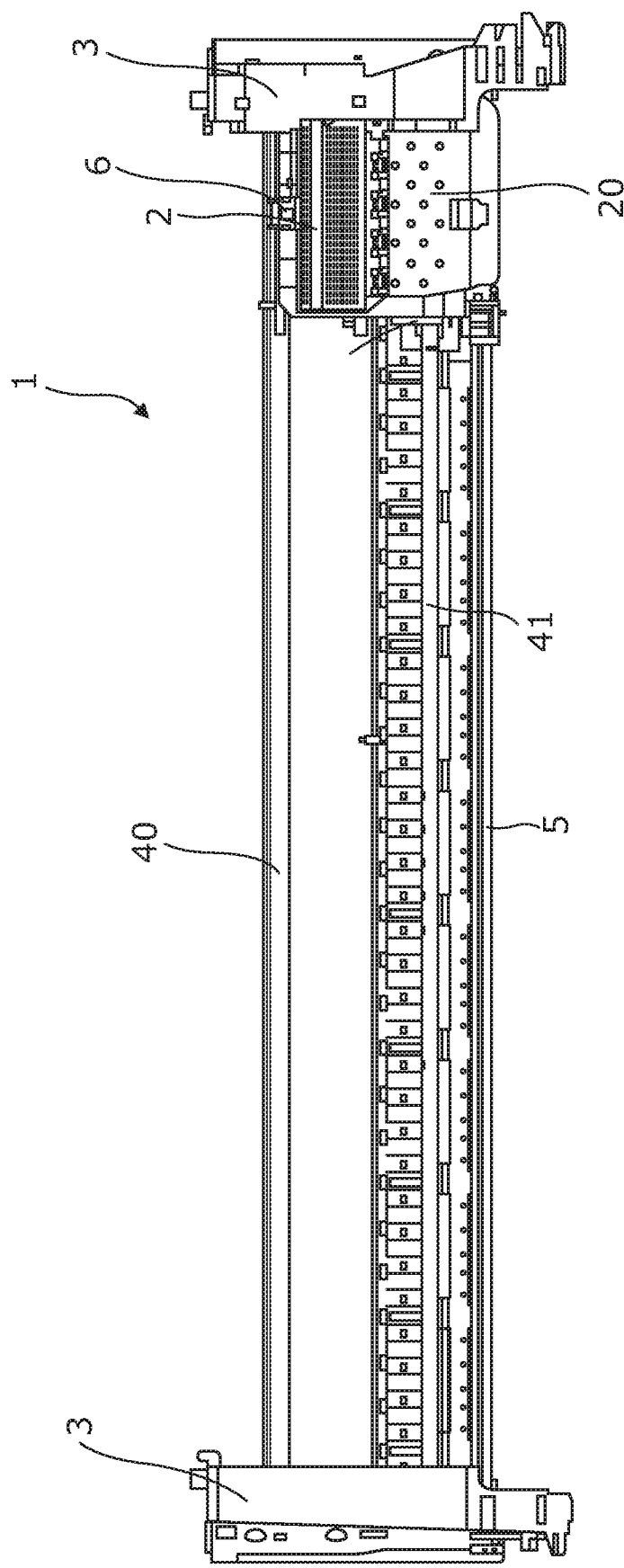
FIG. 1 schematically shows a plan view of an example of a carriage arrangement over a print medium support.

In the following description and figures, some example implementations of print apparatus, print systems, and/or printers are described. In examples described herein, a "printer" or a "printing system" may be a device to print content on a physical medium (e.g., paper, textiles, a layer of powder-based build material, etc.) with a print material (e.g., ink or toner). For example, the printer may be a wide-format print apparatus that prints latex-based print fluid on a print medium, such as a print medium that is size A2 or larger. In some examples, the physical medium printed on may be a web roll or a pre-cut sheet. In the case of printing on a layer of powder-based build material, the print apparatus may utilize the deposition of print materials in a layer-wise additive manufacturing process. A printer may utilize suitable print consumables, such as ink, toner, fluids or powders, or other raw materials for printing. In some examples, a print apparatus may be a three-dimensional (3D) print apparatus. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

In one example, the present disclosure describes a carriage for use in a printing device. However, in another example, the carriage of the present disclosure can be incorporated in a scanning device.

The carriage disclosed herein may comprise or be otherwise coupled to a drive mechanism that is used to propel the carriage along a drive direction, the carriage may comprise a receptacle to receive, e.g., a print head, when printing a document. Similarly, in the case of a scanning device, the drive mechanism that is used to propel a carriage, to which is coupled a scanning element.

Moreover, the carriage is to move in a drive direction along a carriage beam. The carriage beam is a beam that extends longitudinally along the drive direction thereby defining the movement limits of the carriage and may have different configurations including its shape and material. In an example, the beam is a plate, however, other shapes include a cylindrical element, a triangular prism wherein one of the faces of the prism acts as a carriage beam along which the carriage slides.

It is therefore hereby disclosed a carriage arrangement comprising:
- a carriage;
- a carriage beam;
- a drive mechanism to move the carriage along a longitudinal direction of the carriage beam; and
- a lubrication roller at a fixed position relative to the carriage beam, the lubrication roller having an outer surface with a non-lubricating section and a lubricating section each at a determined angular position;

wherein the carriage is to contact the outer surface as it moves passed the lubrication roller and wherein the contact causes a rotation of the roller that modifies the angular positions of the lubricating section and the non-lubricating section.

In an example, the lubrication roller comprises a ratchet mechanism thereby having unidirectional rotation.

Furthermore, the lubrication device may comprise a lubricant deposit fluidically coupled to the lubricating section of the outer surface. In an example, the lubricating deposit is coupled to the lubricating section by capillarity.

In a further example, the carriage arrangement has a parking position in the vicinity of a longitudinal edge of the carriage and the lubrication device is located in the parking position.

In an example, the lubrication roller comprises a friction surface that is to contact the carriage, the friction surface being positioned on a longitudinal extreme of the roller.

In another example, the non-lubrication section corresponds to at least 50% of the outer surface, and optionally least 75% of the outer surface.

Also, it is hereby disclosed a printing system comprising:
- a carriage beam;
- a print medium support;
- a carriage to slide along the carriage beam and extending over the print medium support,
- a lubrication roller fixed at a position along the carriage beam wherein the lubrication roller comprises an outer surface with a non-lubricating section or a lubricating section extending longitudinally along the lubrication roller at a determined angular position; and wherein the carriage reciprocates along the carriage beam and, upon contact with the lubrication roller rotates modifying the determined angular position of the lubricating section.

In an example, the lubricating section comprises a longitudinal slot with an absorbent material. For example, the lubrication roller may comprise a lubricant deposit fluidically coupled to the absorbent material.

In a further example, the system comprises a parking position and a holder provided in the parking position being the holder to maintain the lubrication device in the parking position. In some examples, the parking position is located about an edge of carriage beam.

The lubrication roller may be provided with an outer surface that includes the lubricating section, the lubricating section corresponding to less than 50% of the outer surface, and optionally, less than 75% of the outer surface.

Moreover, the present disclosure refers to a lubrication method of a carriage beam in a printing system comprising a carriage associated to the carriage beam and a lubrication roller in contact with the carriage beam as to apply a lubricant while moving along the carriage beam, the lubrication roller having lubricating and non-lubricating sections extending longitudinally along an outer surface of the lubrication roller and the method comprising:
  moving the carriage towards the lubrication device,
  causing a rotation of the lubrication roller by contacting in a first direction; and
  moving the carriage in a second direction opposite to the first direction contacting the lubrication roller.
wherein the lubrication roller is to contact the carriage with a lubricating section or a non-lubricating section in the first and the second direction and to modify an angular position of the lubricating section and the non-lubricating section upon contact with the carriage in the first and/or the second direction In an example, the lubrication roller comprises a ratchet mechanism to prevent the rotation of the roller upon contact with the carriage as it moves in the first or the second direction FIG. 1 shows an example of a carriage 2 for use as part of a printing system 1. In the example of FIG. 1, it is shown part of a printing system 1 wherein some elements have been removed to increase the intelligibility of the figure. The printing system comprises a carriage 2 comprises a receptacle 20 that is to house a printing element, e.g., a printhead or, in another example, a scanning element such as a scan bar. In any case, the printing system comprises a carriage beam 40 with a length that defines the travel distance of the carriage 2 in a swath direction, e.g., the drive direction X of FIG. 1, in particular, the carriage beam 40 may comprise a beam surface in contact with the carriage 2 so that the carriage slides along such carriage beam 40. Also, the printing system 1 may comprise additional beams 41 to ensure stability of the carriage 1 as it moves along the drive direction X.

For ease of explanation, the following examples will be described with reference to a printing system in which the carriage moves in a direction along the width of the media, however, as explained above, the same principles apply to carriages that move along the length of a media, i.e., along a media path direction Y of FIG. 1.

In an example, the carriage 2 comprises or is otherwise coupled to a drive mechanism or an impelling mechanism. The drive mechanism may be part of the printing system, for example, may be coupled to the carriage 2 so that, in operation, the drive mechanism moves together with the carriage 2. In other examples, the drive mechanism is coupled to the carriage 2 by a belt arrangement so that the carriage 2 moves along the carriage beam 40 while the drive mechanism is fixed.

The carriage 2 is propelled by the drive mechanism to reciprocate along the carriage beam 40 as to perform an action on a media that, for example, may be supported in a media support 5. To ensure the integrity and quality of the system, the carriage arrangement may comprise means to lubricate the carriage beam 40.

In an example, a user may determine that a lubrication operation is needed on the carriage beam and instruct the printing system to perform such an operation, however, in other examples the printing system 1 may comprise means to determine that a lubrication operation is needed, for example, by analyzing the power needed by the drive system to move the carriage 2 along the carriage beam 4, if the power needed is above a threshold, a lubrication operation may be triggered by the system. In other examples, the lubrication operation may be performed upon request by a user and/or periodically, e.g., once the carriage has reciprocated a determined amount of times and/or after a determined amount of time has passed since a previous lubrication operation. The lubrication operation may be triggered by a controller and the controller may instruct the drive system and the carriage accordingly.

As mentioned above, the carriage beam 40 may have a longitudinal direction that corresponds to the drive direction X of the carriage. In an example, parking positions 3 may be defined on the vicinity of the edges of the carriage beam 40. Either or both of the parking positions 3 may receive a lubrication device. In an example, the carriage arrangement may comprise means to hold the lubrication device in a fixed position relative to the longitudinal direction of the carriage beam 40.

In the example of FIG. 1, a lubrication device 6 is coupled to the carriage arrangement in a fixed position relative to the carriage beam 40 and, to perform a lubrication operation, the carriage 2 is to move towards the lubrication device wherein, upon contact, a part of the carriage may be provided with a lubricating agent. In an example, in order to avoid over-lubrication of the carriage 2 and/or the carriage beam 40 in some cases the contact will provide the lubricating agent and in some cases the contact will not have a transfer of lubrication agent from the lubrication device towards the carriage 2 or the carriage beam 40. The reasoning behind avoiding over-lubrication is mainly because it can create dirtiness or even lubricant accumulation that may affect the movement of the carriage or even, in extreme cases, affect print quality.

The carriage arrangement 1 of the present disclosure allows for the carriage to perform an operation such as e.g., a printing or scanning operation by reciprocating along the carriage beam 40 while the lubrication device 6 is stayed in a determined position along the carriage beam 40. During a printing operation, the carriage 2 reciprocates along the carriage beam and, during the operation, may reach the position of the lubrication device 6 thereby contacting it. The lubrication device 6 may be in a position wherein a lubricating section of a roller may contact the carriage 2 or a non-lubricating section of the roller may contact the carriage, therefore, in some contacts a lubrication operation may be performed (if there is a contact between the carriage and the lubricating section that creates a transfer of lubrication fluid between the lubrication device 6 and the carriage 2) and, in some others, the contact will not generate a lubrication operation, i.e., lubrication fluid may not be transferred between from the lubrication device to the carriage 2.

Also, the carriage 2 comprises a housing 7 that, in an example, is to receive a printhead, the printhead comprising a set of nozzles to eject a printing fluid towards the print medium. In other examples, the carriage 2 may be associated to a scan bar and may be moved along the length of a substrate as to scan it.

In the example shown in FIG. 1 the carriage beam 4 extends longitudinally over the media support 5 as to allow the reciprocation of the carriage along a dimension of the media such as, e.g., the width of the media. A parking zone 3 may me any zone within the carriage outside the print zone, i.e., that does not correspond to the width of the media. The parking position may be, in an example, located in the neighborhood of the extreme of the carriage beam 40, therefore, about the end-of-travel of the carriage. In an example, the neighborhood of the extreme 40 may be a position separated from the extreme 40 by a distance below 10% of the total length of the carriage beam 40.

In an example, the carriage may be provided to be part of a system (e.g., a printing or a scanning system) so that the carriage beam 40 is associated to a structural fixed element that may be part of the chassis of a system and may define the end-of-travel for the carriage 2.

The parking position of the lubrication device 6 may be, in an example, located in the neighborhood of the extreme of the carriage beam 40, therefore, about the end-of-travel of the carriage beam. In an example, the neighborhood of the extreme 40 may be a position separated from the extreme 40 by a distance below 10% of the total length of the carriage beam.

Figure 2:
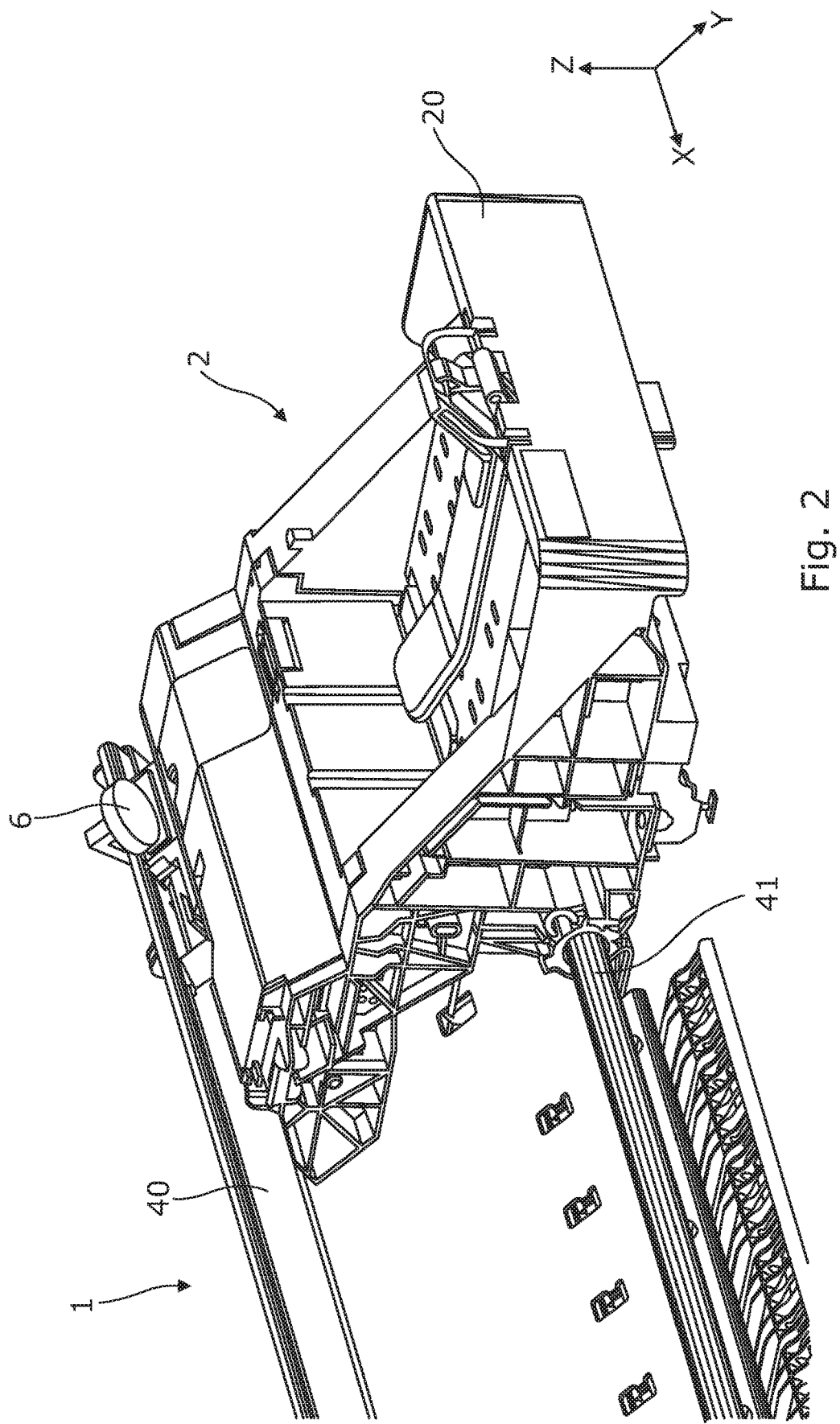
FIG. 2 schematically shows a detail view of one of the edge sections of the carriage arrangement of FIG. 1.

FIG. 2 shows an enlarged view showing a detail wherein the carriage 2 is in contact with the lubrication device 6, e.g., in a parking position 3. As the carriage 2 moves towards the lubrication device 6, the lubrication device 6 contacts the carriage 2, in particular, a part of the carriage that is to slide along the carriage beam 40.

The lubrication device may include a lubrication roller wherein the outer surface of the lubrication roller comprises a lubricating section and a non-lubricating section and, upon contact with the carriage 2 the roller may contact the carriage with the lubricating section or the non-lubricating section depending on its angular position. In an example, the lubrication roller comprises a plurality of lubricating and non-lubricating sections.

Also, the roller modifies the angular positions of the lubricating and non-lubricating sections upon contact with the carriage, in that manner, it is assured that not all the passes of the carriage along the position of the lubrication device 6 cause a supply of lubrication fluid, thereby reducing the risk of possible over-lubrication. In the context of the present application it should be considered that a non-lubricating section of the roller is a section wherein no lubrication fluid is transferred from a lubrication fluid supply to the carriage. In contrast, when a lubricating section contacts the carriage 2 a determined amount of fluid is transferred from the lubrication device 6 towards the carriage 2. An example of a lubricating section may be a section of the roller with a foam or any other absorbent material and wherein the foam is also provided with a lubrication fluid, e.g. by capillarity.

Figure 3:
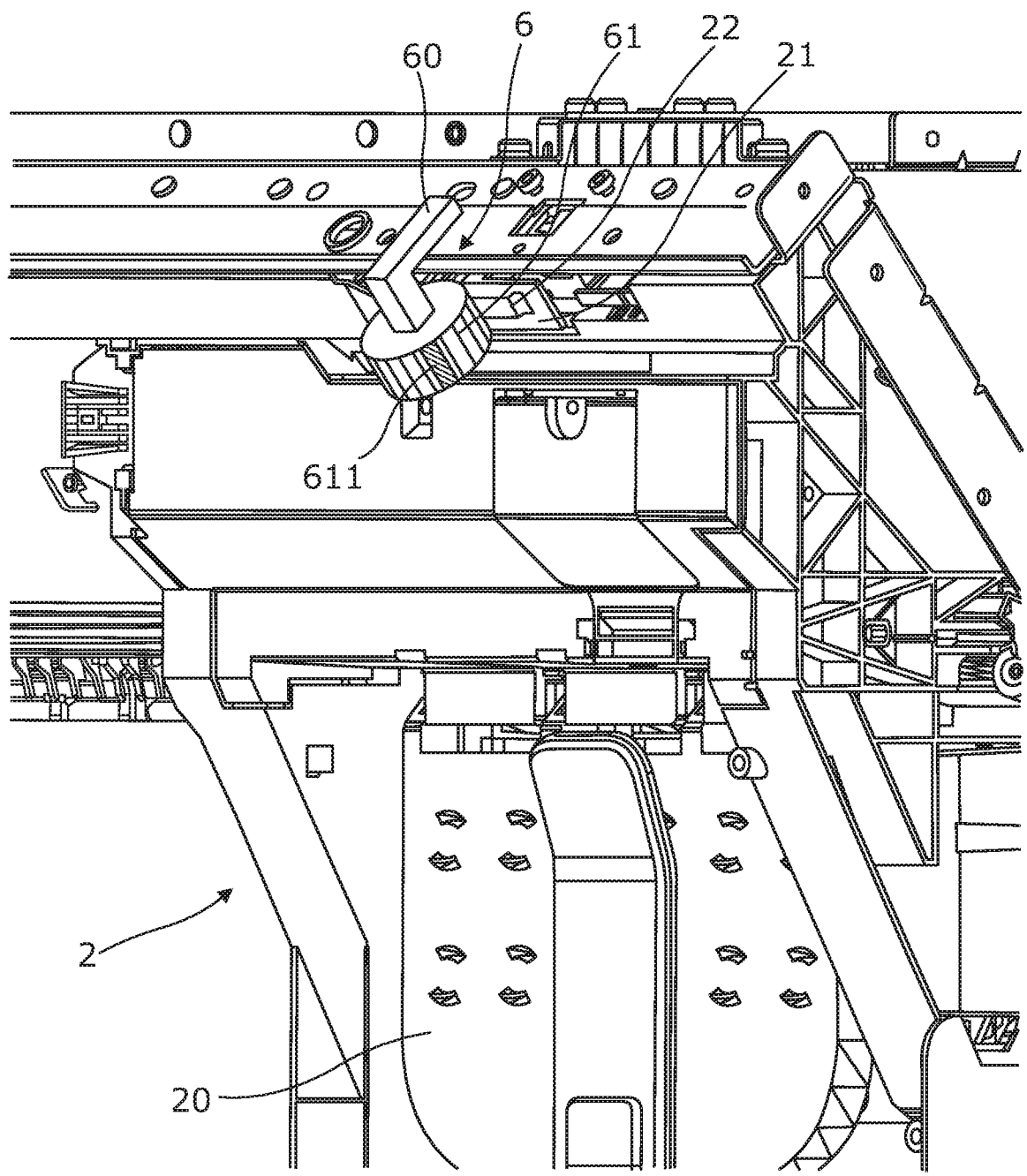
FIG. 3 shows an enlarged view of FIG. 2 detailing the lubrication arrangement.

FIG. 3 shows a further detail wherein the lubrication device 6 can be seen in greater detail. In the example of FIG. 3, the lubrication device 6 is a lubrication roller 61 with an outer surface including a lubricating section 611 that extends along the height of the roller (along its circular bases) at a determined angular position. The remaining section of the outer surface 61 is, in an example, a non-lubricating section.

The lubrication roller 61 is fixed at a position along the carriage beam, e.g., by an attachment element 60.

As the carriage 2 moves towards the lubrication device 6, a slider 22 contacts the lubrication roller 61 and forces a rotation of the lubrication roller 61 thereby modifying the angular position of the lubricating section 611. Therefore, the lubrication roller 61 performs a lubrication operation in some of interactions with the carriage 2 whereas, in others, only a contact is provided, a rotation may occur, but no lubrication is performed.

In an example, the lubrication roller has an outer surface that is to contact the carriage, the lubricating section 611 may represent, e.g., up to 50% or up to 75% of the outer surface. The remaining section is considered to be non-lubricating section.

For example, the carriage 2 may comprise a slider 22 which is to contact the carriage beam 40 during the movement of the carriage and a friction element 21 which is to contact a portion of the lubrication roller 61 as to force its rotation.

In an example, the roller may be provided with elements to prevent the rotation of the lubrication roller in a determined direction, for example, the lubrication roller 61 may be provided with a ratchet mechanism as to allow a rotation in a clockwise direction while preventing rotation in the counter-clockwise direction, in that way, a reciprocating movement of the carriage passing the lubrication device 6 rotates it in a single direction. In that way, the user may configure the number of lubricating sections 611, the size of the roller and other variables to properly configure the lubrication device as to fulfill the needs of the system.

Figure 4:
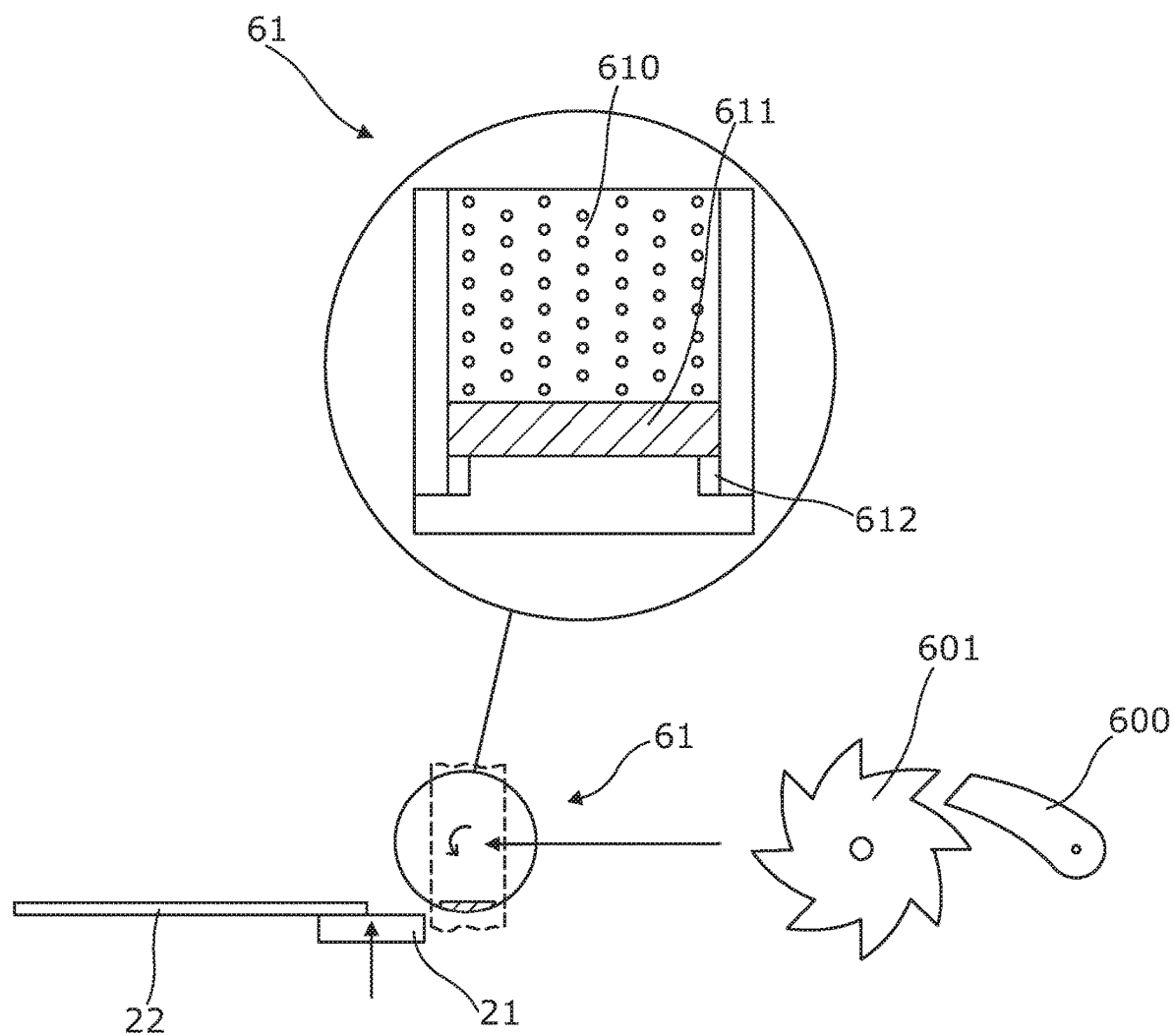
FIG. 4 shows a schematic of the elements within a lubrication roller according to an example.

FIG. 4 shows a schematic example of a lubrication device 6. In the example of FIG. 4, the lubrication device comprises a lubrication roller 61 which has a lubricant reservoir 610 wherein lubricant is stored and an absorbent material that acts as a lubricating section 611 of the lubrication roller 61. The absorbent material is to establish a fluid communication between the lubricant storage 610 and the carriage, for example, by capillarity. Also, the lubrication roller 61 may comprise a protruding friction member 612 that is to contact the friction element 21 of the carriage 2 as to force the rotation of the lubrication roller 61.

Also, in an example, the lubrication roller 61 is fixed to a determined position relative to the carriage beam by pawl 600 and ratchet 601 arrangement so that the roller only rotates in a single direction whereas in the other direction it remains without rotating and rubs or slides with an element of the carriage 2, in particular, the outer surface of the roller contacts the slider 22.

Figure 5:
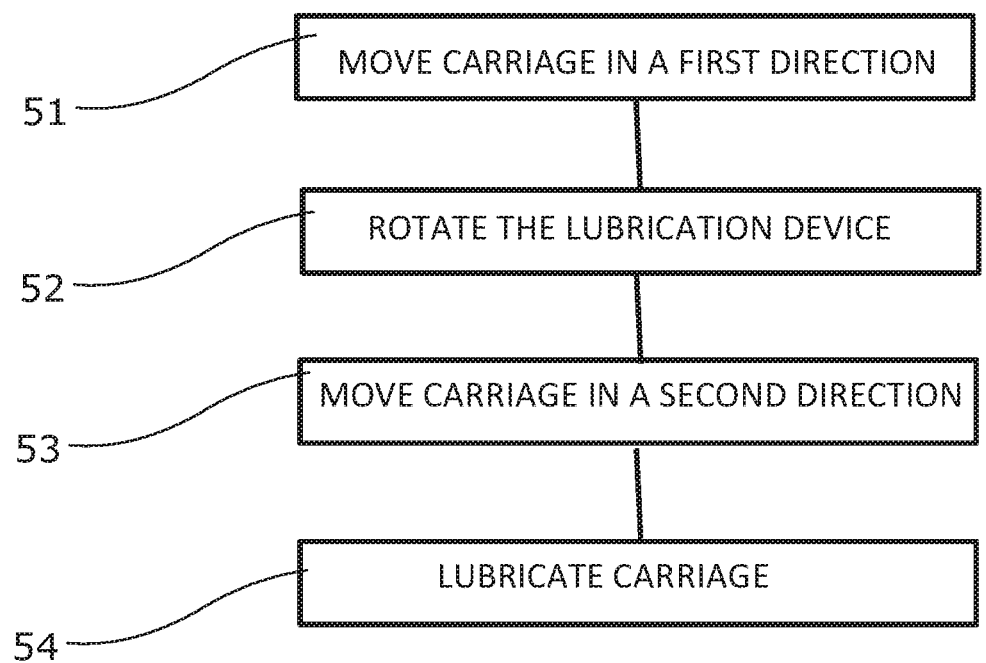
FIG. 5 shows a flowchart of a lubrication method according to an example.

FIG. 5 shows an example of a flowchart according to an example. In this example the user or the system determines that a lubrication operation is to be performed, the carriage 2 is moved towards the lubrication device 6 in a first direction 51. Then, the carriage moves past the lubrication device in the first direction causing a rotation 52 to the lubrication device 6, in particular, to the lubrication roller 61. Then the carriage 2 is moved in a second direction opposite to the first direction 53 moving the carriage past the lubrication device 6 thereby causing a lubrication operation to be performed 54.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teachings. It is to be understood that any feature described in relation to any one example may be used alone, or in combination with other features described, and may also be used in combination with any features of any other of the examples, or any combination of any other of the examples.

The invention claimed is:

1. A carriage arrangement comprising:
    a carriage;
    a carriage beam;
    a drive mechanism to move the carriage along a longitudinal direction of the carriage beam; and
    a lubrication roller at a fixed position relative to the carriage beam, the lubrication roller having an outer surface with a non-lubricating section and a lubricating section each at a determined angular position;
wherein the carriage is to contact the outer surface as it moves passed the lubrication roller and wherein the contact causes a rotation of the roller that modifies the angular positions of the lubricating section and the non-lubricating section.

2. The carriage arrangement of claim 1, wherein lubrication roller comprises a ratchet mechanism thereby having unidirectional rotation.

3. The carriage arrangement of claim 1, wherein the lubrication device comprises a lubricant deposit fluidically coupled to the lubricating section of the outer surface.

4. The carriage arrangement of claim 3, wherein the lubricating deposit is coupled to the lubricating section by capillarity.

5. The carriage arrangement of claim 1, further comprising a parking position in the vicinity of a longitudinal edge of the carriage and wherein the lubrication device is located in the parking position.

6. The carriage arrangement of claim 1 wherein the lubrication roller comprises a friction surface that is to contact the carriage, the friction surface being positioned on a longitudinal extreme of the roller.

7. The carriage arrangement of claim 1, wherein the non-lubrication section corresponds to at least 50% of the outer surface, and optionally least 75% of the outer surface.

8. A printing system comprising:
    a carriage beam;
    a print medium support;
    a carriage to slide along the carriage beam and extending over the print medium support,
    a lubrication roller fixed at a position along the carriage beam wherein the lubrication roller comprises an outer surface with a non-lubricating section or a lubricating section extending longitudinally along the lubrication roller at a determined angular position; and
wherein the carriage reciprocates along the carriage beam and, upon contact with the lubrication roller rotates modifying the determined angular position of the lubricating section.

9. The system of claim 8, wherein the lubricating section comprises a longitudinal slot with an absorbent material.

10. The system of claim 9, wherein the lubrication roller comprises a lubricant deposit fluidically coupled to the absorbent material.

11. The system of claim 8, further comprising a parking position and a holder provided in the parking position being the holder to maintain the lubrication device in the parking position.

12. The system of claim 8, wherein the parking position is located about an edge of carriage beam.

13. The system of claim 8 wherein the lubrication roller has an outer surface that includes the lubricating section, the lubricating section corresponding to less than 50% of the outer surface, and optionally, less than 75% of the outer surface.

14. A lubrication method of a carriage beam in a printing system comprising a carriage associated to the carriage beam and a lubrication roller in contact with the carriage beam as to apply a lubricant while moving along the carriage beam, the lubrication roller having lubricating and non-lubricating sections extending longitudinally along an outer surface of the lubrication roller and the method comprising:
    move the carriage towards the lubrication device,
    causing a rotation of the lubrication roller by contacting in a first direction; and
    move the carriage in a second direction opposite to the first direction contacting the lubrication roller,
wherein the lubrication roller is to contact the carriage with a lubricating section or a non-lubricating section in the first and the second direction and to modify an angular position of the lubricating section and the non-lubricating section upon contact with the carriage in the first and/or the second direction.

15. The method of claim 14 wherein the lubrication roller comprises a ratchet mechanism to prevent the rotation of the roller upon contact with the carriage as it moves in the first or the second direction.

* * * * *